United States Patent [19]

Carter et al.

[11] 3,962,562

[45] June 8, 1976

[54] RESISTANCE SOLDER UNIT CONTROL

[75] Inventors: William F. Carter, Philadelphia; John H. Drinkard, Jr., Exton, both of Pa.

[73] Assignee: Burroughs Corporation, Detroit, Mich.

[22] Filed: Jan. 14, 1974

[21] Appl. No.: 432,831

[52] U.S. Cl. ................................ 219/490; 219/85; 219/116
[51] Int. Cl.² ........................................ H05B 1/02
[58] Field of Search ................. 219/85 R, 110, 468, 219/490, 494, 503, 85 CA, 85 CM, 85 M, 85 G, 85 F, 115, 116

[56] References Cited
UNITED STATES PATENTS

| | | | |
|---|---|---|---|
| 3,514,569 | 5/1970 | Pfgelzer et al. | 219/110 |
| 3,912,897 | 10/1975 | Willersdorf | 219/85 X |

Primary Examiner—R. Skudy
Assistant Examiner—Fred E. Bell
Attorney, Agent, or Firm—Kevin R. Peterson; Edward J. Feeney, Jr.; Leonard C. Brenner

[57] ABSTRACT

A control for a resistance solder unit for maintaining solder probe temperature within an acceptable range is provided using a redundant interlocking switching circuit. A pair of dual, single pole, single throw, variable time delay electronic relays, and a pair of dual, single pole, single throw electrical relays may be interconnected into the supply line for the AC to DC soldering transformer to control the time and duration of current to a resistance soldering probe. Included may be an autotransformer-coupled feedback from the resistance solder ground return of the soldering probe. Typically, visual and audible signals provide probe power status.

8 Claims, 2 Drawing Figures

RESISTANCE SOLDER UNIT CONTROL

BACKGROUND OF THE INVENTION

The control of soldering temperatures is necessary in the soldering of electrical and mechanical connections in order to obtain a proper solder joint. If soldering temperature is too low a cold joint will result which will provide a poor electrical and mechanical connection which may very easily break under the slightest stress. On the other hand, if soldering temperature is too high, damage may result to the electrical or mechanical components from the excessive heat. A desirable soldering range for tin solder is 425° to 525°F.

Normally, the soldering technician judges the proper application of heat to the solder joint by a visual observation of solder flow. He applies or withdraws the heat probe from the solder in order to regulate temperatures.

However, in some manufacturing processes, such as the building of computer processor backplanes, the observation of solder flow between closely spaced wire-wrap terminal pins is hampered. The close centers of these pins preclude the use of traditionally used copper soldering probes. The use of resistance soldering probes has developed for this application. However, when a resistance soldering unit is used, probe temperatures may fluctuate faster than with a standard conduction soldering unit. This requires an even greater control than with a metal probe conduction unit. Control of the soldering temperature becomes to critical to rely on a technician's judgment.

It is desirable to have an automatic control mechanism to regulate soldering probe temperature to within an acceptable range.

An objective of this invention therefore, is to provide an automatic current cut-off to a resistance soldering probe when probe temperature reaches the maximum acceptable soldering temperature.

Another objective is to provide a control for locking out the power to the soldering probe until probe temperature falls to the minimally acceptable soldering temperature and then to reinstate probe current.

A further objective is to have the above mentioned cut-off and locking-out controls adjustable for different operating time periods.

An even further objective of this invention is to provide the control circuit as economically as possible while maintaining control accuracies.

SUMMARY OF THE INVENTION

The objectives of this invention may be embodied in a control circuit connected into an AC power supply line to the resistance probe, current transformer of a resistance soldering unit.

A feedback relay is preferably coupled via an auto-transformer to the probe ground return. Its activation may indicate power in the probe and may simultaneously cause the activation of a pair of individually adjustable time delay electronic relays.

The closing of the first time delay relay may break the line to the probe's current transformer and may activate a secondary relay which may supply continued power to the pair of time delay relays.

The closing of the second time delay relay may reset the control unit by deactivating all relays. This deactivation may then permit a reestablishment of the power connection to the probe current transformer and the initiation of another control cycle.

DESCRIPTION OF THE DRAWINGS

The features of this invention will become more fully apparent from the following detailed description, attached claims and accompanying drawings in which like characters refer to like parts and in which:

DETAILED DESCRIPTION OF THE INVENTION

Figure 1:
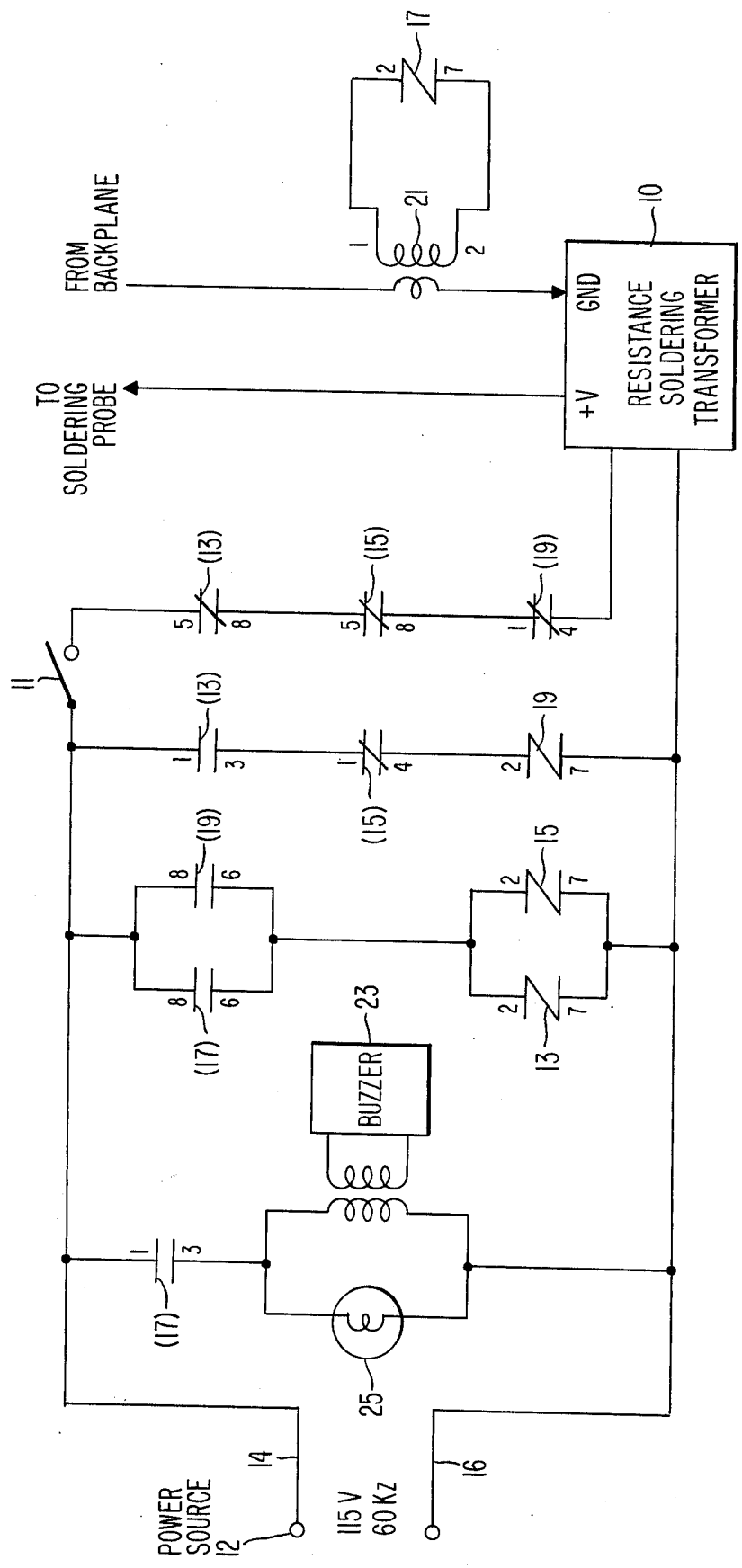
FIG. 1 is a schematic circuit diagram of the control unit.

A control circuit for maintaining a solder probe temperature within an acceptable range is connected into the AC power supply line to a resistance probe current transformer 10 of a resistance soldering unit as shown in FIG. 1.

Included in this circuit is a manually operated power switch 11, two manually and individually adjustable, electronic time delayed relays 13 and 15, two electrical relays 17, 19, an auto transformer 21 and a buzzer 23 and operating lamp 25.

Transformer 11 is a 500 watt AC to DC power converter unit of the type manufactured by the Ideal Industries, Inc., Model 12–163.

Relays 13 and 15 are each Eagle Signal electronic relays, Model CG 10A6, rated for 10 amps and delay adjustable from 0.25 seconds to 5 seconds. Relays 13, 15 are dual, single pole, single throw switch relays. The connection across one of the pair of poles of relay 13 is closed and the connection across the other pair of poles is open when relay 13 is in the inactivated state. The connections across both pairs of poles of relay 15 are closed when relay 15 is in the inactive state.

Relays 17, 19 are each Potter and Brumfield electric relays, Model KRP11-A6, rated for 10 amps. These relays 17, 19 are dual, single pole, single throw relays wherein relay 17 has both switch connections biased to the open position while relay 19 has only one switch biased to the open position (position for inactivated state of the relay).

Auto transformer 21 is a modified Staco Model 171 auto transformer. This transformer 21 is modified by removing the iron core from the stock transformer and creating a new secondary winding by making a single loop around the existing coil.

Buzzer 23 and indicator lamp 25 are any of a variety of standard 115v devices.

Resistance soldering transformer 10 is connected to a 115v, 60 cycle power source 12 via two lead lines 14, 16. One of the power lines to transformer 10 line 14 is interruptable by the operation of any of a series of four switches connected to it.

The first switch in the series is the manually operated switch 11 biased to the open position. The second switch is the relay 13 operated switch biased to the closed position. While the third switch in the series is the relay 15 operated switch which is biased to the closed position. The fourth switch is the relay 19 operated switch biased to the closed position. In particular, the input to switch 11 is connected to the supply line 14 from AC source 12. The output of switch 11 feeds the pin 5 of relay 13. The output, pin 8, of relay 13 is connected to relay 15 pin 5 while pin 8 of relay 15 is connected to relay 19 pin 1. Pin 4 of relay 19 connects to an input terminal of transformer 10.

Connected across AC input lines 14, 16 is the open biased switch of relay 17, it being in series with the parallel connection of buzzer 23 and lamp 25. Thus, pin 1 of relay 17 is connected to input line 14, while pin 3 of relay 17 connects to the terminal of buzzer 23 and lamp 25. The other terminal of buzzer 23 and lamp 25 are both connected to AC line 16.

Connected across AC lines 14, 16 is the series connection of the open biased switch of relay 13, the relay 15 closed biased switch, and the activation coil of relay 19. In parallel with this series is the parallel connection of, the open biased switch of relay 17 and the relay 19 open biased switch, being connected in series with the parallel connection of the relay 13 activation coil and the relay 15 activation coil. Particularly, AC line 14 is connected to pin 1 of relay 13 and pin 8 of relays 17 and 19. Relay 15, pin 1, is tied to pin 3 of relay 13. Pin 4 of relay 15 is tied to pin 2 of relay 19. The pin 7 of relay 19 connects to AC line 16. Pin 6 of relays 17 and 19 are tied together and to pin 2 of relays 13 and 15. Pin 7 of relays 13 and 15 are connected to AC line 16.

Auto transformer 21 is connected into the ground return line from the soldering probe to soldering transformer 10 with the activation coil of relay 17 connected across the output of the transformer 21. Therein the single coil loop of transformer 21 is connected into the ground return line to the resistance soldering transformer 10. Pin 2 of relay 17 is connected to pin 1 of the transformer 21 with pin 7 of relay 17 connected to pin 2 of the transformer 21.

Figure 2:
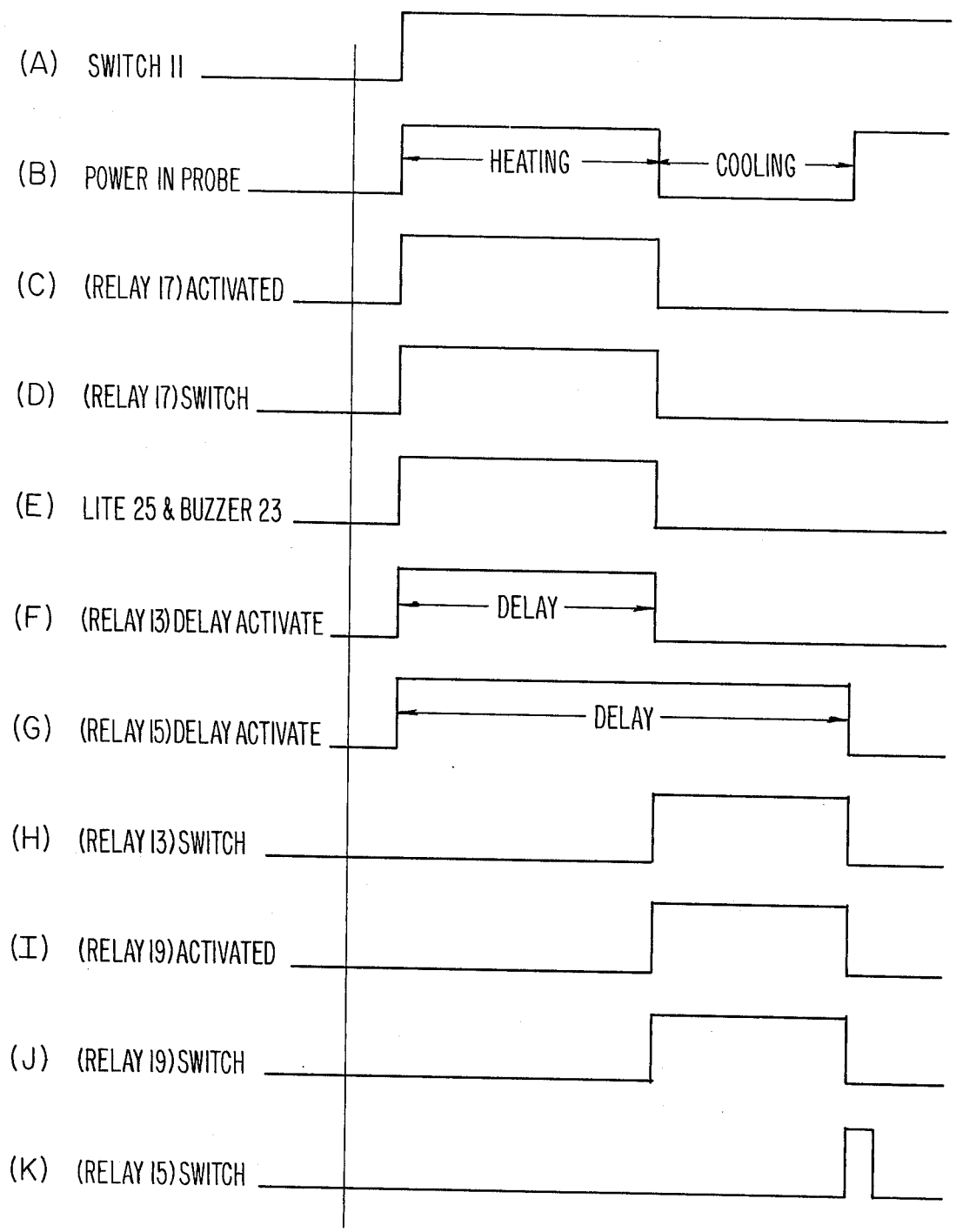
FIG. 2 is a timing diagram for the operation of the circuit.

The operation of the circuit may be better understood from the timing diagram of FIG. 2.

When the power switch 11 (line 1, FIG. 2) is closed, power is transferred to the soldering probe (line 2) and the probe begins heating. A current in the probe line activates relay 17 (line 3) which causes relay 17's switches to close (line 4) feeding current to the lamp 25 and buzzer 23 (line 5) and to delay relays 13, 15 causing these relays 13, 15 to be activated (lines 6, 7).

When the delay time of relay 13 has elapsed, the relay 13 switch in the transformer 10 power line opens, cutting the power to the probe (line 2) and the relay 13 switch feeding relay 19's activation coil closes activating relay 19 (lines 8, 9). Relay 19's activation closes the switch in the alternate path to relays 13, 15 activation coils, thus maintaining continuous power to these relays 13, 15 with a tolerable interruption.

When the delay time of relay 15 has elapsed, the relay 15's switch in the transformer 10 power line and the switch feeding relay 19 open (line 11) cutting power to all parts of the circuitry including power to all relay activation coils. This operation resets the circuit. All relay switches thus return to the inactivated or biased position.

Current is restored to transformer 10 and the soldering probe to begin the next cycle.

The tolerances by which the circuit components must operate may be critical. The delay times of relays 13, 15 should be regulated to closely control probe temperature. These times must remain constant ±5% for the operation of the circuit. For this reason commercially available mechanical time delay relays are not accurate enough.

The interruption in power to relays 13 and 15 is minimal and in the few millisecond range, not enough to reset these relays.

An accurate control of probe temperature ranges may be obtained by adjusting the time delays of relays 13 and 15. These relays are intentionally chosen to be manually setable in that the control circuit may be used for soldering with silver and other types of solder where the desirable probe temperature ranges are different than with tin solder. For any specific application the relays 13 and 15 time delays are adjusted to empirically derive data and set-up before the manufacturing operation begins.

Since many different embodiments of this invention could be made without departing from the scope thereof, it is intended that all matter contained herein shall be interpreted as illustrative and not in the limiting sense.

What is claimed is:

1. A control circuit for controlling soldering probe temperatures in a resistance soldering unit, having an AC to DC power converter supplying direct current to a resistance soldering probe circuit, said circuit including a ground return line to said power converter, comprising:
   means connected to the AC supply to said power converter for interrupting the alternating current to a transformer contained therein for limiting temperature rise in said soldering probe; and
   means associated with said interrupting and limiting means for permitting reestablishment of current to said power converter for establishing a lower soldering temperature in said probe.

2. The apparatus of claim 1 wherein said interrupting and limiting means includes:
   means coupled to said power converter supply line for opening the supply current to said power converter at a predetermined delay time after activation; and
   means coupled to said ground return for activating said opening means when current is present in said probe circuit.

3. The apparatus of claim 2 wherein said opening means includes:
   a first time delay relay, said relay having a single pole, single throw switch biased to the closed position connected into the AC supply line to said transformer.

4. The apparatus of claim 3 wherein said activating means includes:
   an autotransformer, said transformer being connected into said ground return line; and
   a first dual, single pole, single throw relay, said first relay having a first switch biased to the open position and connected to supply current to said first time delay relay's activation coil, and said first relay having its activation coil connected to said auto transformer.

5. The apparatus of claim 4 wherein said permitting means includes:
   means for maintaining current to said first time delay relay after said relay has interrupted the current to said power transformer; and
   means for resetting all control circuit components a predeterminable time after said first time delay relay caused.

6. The apparatus of claim 5 wherein said current maintaining means includes:
   a second dual, single pole, single throw relay, said second relay having a first switch biased to the open position and connected to supply current to said first time delay relay's activation coil, said first switch being in parallel with said first switch of said first dual relay.

7. The apparatus of claim 6 wherein said resetting means includes:

a second time delay relay, said relay having a first single pole, single throw switch biased to the closed position connected into the AC supply line to the activation coil of said second dual relay.

8. The apparatus of claim 7 wherein the time delay of said second time delay relay is longer than said first time delay relay.

* * * * *